United States Patent
Kori et al.

(10) Patent No.: US 7,391,685 B2
(45) Date of Patent: Jun. 24, 2008

(54) METHOD FOR LIMITED RECORDING OF AN INFORMATION SIGNAL, SYSTEM FOR CONTROLLED RECORDING OF AN INFORMATION SIGNAL, AND INFORMATION SIGNAL RECORDING APPARATUS

(75) Inventors: Teruhiko Kori, Kanagawa (JP); Masaya Otsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 905 days.

(21) Appl. No.: 10/880,776

(22) Filed: Jun. 30, 2004

(65) Prior Publication Data

US 2004/0240854 A1 Dec. 2, 2004

Related U.S. Application Data

(62) Division of application No. 09/482,768, filed on Jan. 13, 2000, now Pat. No. 6,781,935.

(30) Foreign Application Priority Data

Jan. 14, 1999 (JP) .................................. 11-007664

(51) Int. Cl.
  *G11B 15/52* (2006.01)
(52) U.S. Cl. .................................. 369/47.12; 369/53.21
(58) Field of Classification Search ........................ None
  See application file for complete search history.

(56) References Cited

U.S. PATENT DOCUMENTS

| 5,057,947 A | 10/1991 | Shimada |
| 5,084,790 A | 1/1992 | Endoh ........................... 360/60 |
| 5,233,477 A | 8/1993 | Scheffler ....................... 360/15 |
| 5,331,617 A | 7/1994 | Fuma et al. ............... 369/53.12 |
| 5,587,978 A | 12/1996 | Endo et al. |
| 5,602,684 A | 2/1997 | Corbitt et al. .................. 386/52 |
| 6,034,832 A | 3/2000 | Ichimura et al. |
| 6,236,802 B1 | 5/2001 | Yamamoto .................... 386/52 |
| 6,577,810 B1 | 6/2003 | Ogino |

FOREIGN PATENT DOCUMENTS

| DE | 43 12 922 A1 | 10/1993 |
| EP | 0 328 141 | 8/1989 |
| EP | 0 328 141 A1 | 8/1989 |
| EP | 0 813 194 | 12/1997 |
| EP | 0 813 194 A2 | 12/1997 |
| EP | 0 878 794 | 11/1998 |
| EP | 0 878 794 A2 | 11/1998 |

*Primary Examiner*—Paul W. Huber
(74) *Attorney, Agent, or Firm*—Finnegan, Henderson, Farabow, Garrett & Dunner, L.L.P.

(57) ABSTRACT

A recorder provides to a recorder/player via a high-speed bus content-related information such as a digital audio signal as information, a content ID being identification information on the digital audio signal and a standard playing time of the digital audio signal. The recorder/player has a controller which stores the content ID into a copy-history information management memory when the same content ID is not existent in the memory. The content ID is held for a period measured by a timer. For this period, the recording function of the recorder/player is limited so that the same digital audio signal cannot be copied at a high speed.

2 Claims, 2 Drawing Sheets

METHOD FOR LIMITED RECORDING OF AN INFORMATION SIGNAL, SYSTEM FOR CONTROLLED RECORDING OF AN INFORMATION SIGNAL, AND INFORMATION SIGNAL RECORDING APPARATUS

CROSS-REFERENCE TO RELATED APPLICATION

This application is a divisional application of U.S. patent application Ser. No. 09/482,768, filed Jan. 13, 2000 now U.S. Pat. No. 6,781,935.

BACKGROUND OF THE INVENTION

1. Field of the Invention

The present invention relates to a method for limited copying or recording of an information signal such as audio signal, video signal, etc., a system for controlled copying or recording of information signal, using the method, and an information signal recording apparatus also using the method.

2. Description of the Related Art

Recently, as the digital content service by the Internet, compact disc (CD), digital video disc (DVD), etc. has become popular, illegal copying of a digital content has become a serious matter of piracy. To cope with this problem, it has been proposed to add, to a digital content, copy-controlling information used to prevent the digital content from illegally being copied.

The systems having so far been proposed to prevent such illegal copying mainly include a system for disabling copying of any digital content supplied from a specified information source, a system for enabling to copy a digital content once while disabling further copying of the digital content once copied (generation-managing copy control system). The former system is applied for an original software produced and sold by a content maker, such as a digital data recorded in a DVD-ROM. The latter system (generation-managing copy control system) is applied for information to be broadcast in a broadcasting medium, for example.

The generation-managing copy control systems should desirably be able to effectively manage the copy generation. The copy control systems adapted to manage the copy generation include SCMS (Serial Copy Management System) for audio signals, and CGMS (Copy Generation Management System) for video signals.

The SCMS system is such that a copy disable/enable flag transmitted together with a digital audio signal, and a category code indicative of a digital audio source such as a compact disc (CD), digital audio tape (DAT) or the like, are used to provide a serial-copy control for enabling to copy a digital audio signal only once.

More specifically, the SCMS system controls the copy generation of a digital audio signal using SCMS information including a copy disable/enable flag and category code which are transmitted along with the digital audio signal to enable copying of the digital audio signal only at one generation while disabling further copying of the digital audio signal copied at the previous generation.

The CGMS system is such that for transmission of an analog video signal for example, additional information of 2 bits for control of copying are superposed on the analog video signal in a predetermined horizontal zone of the vertical blanking interval thereof, while for transmission of a digital video, additional information of 2 bits for control of copying is added to the digital video data.

The 2-bit information used in the CGMS system (will be referred to as "CGMS information" hereinafter) takes any of the following states:

[00] . . . Copying is enabled.
[10] . . . Copying is enabled for one generation alone.
[11] . . . Copying is disabled.

When the CGMS information added to a video signal takes the status [10], a recording apparatus adopting the CGMS system will decide that the video signal can be copied, and record the video signal which will however have added thereto the CGMS information changed to the status [11] when recorded. When the CGMS information added to a video signal the recording apparatus is going to record is in the state [11], the recording apparatus will be disabled from copying the video signal.

As in the above, the generation-managing copy control systems such as the SCMS and CGMS are adopted to manage the copy generation and enable to copy an information signal such as an audio signal, video signal, etc. only for a private use. Namely, further copying of an information signal once copied can be disabled and thus such a once-copied information signal will not further be copied repeatedly. Therefore, the due profits for the copyrighter of the information signal will not be caused to lessen by any illegal or fraudulent copying of the information signal, and also his or her copyright for the information signal will not be infringed by any such fraudulent copying.

When the SCMS or CGMS system is used to manage the copy generation for copy of an information signal, it is possible to disable further copying into another recording medium of the information signal once copied. Namely, it is disabled to make a second-generation copy from a first-generation copy. However, there is a problem that many copies can be made of the first-generation copy. That is, an original information signal served as recorded in a CD or DVD, for example, from a content maker can be copied limitlessly from the recording media Also, with use of the so-called high-speed copying technique, an audio or video signal can be copied at a high speed, namely, for a shorter time than the standard reproduction or playing time for the signal. In this case, however since a desired information signal can be copied for a short time, many copies of the information signal can be made for the first generation even if the SCMS or CGMS system is adopted to manage the copy generation and thus many recording media each having an information signal copied thereto can be produced for a relatively short time. If many copies are made of an information signal using the high-speed copying technique, that is, if recording media each having the information signal copied thereto are illegally produced sold by any other person than the author of the information signal or person entitled to have the copyright of the information signal, the author or the entitled person will lose his or her due profits from the information signal to a large extent.

To avoid the above, a copy limiting system has been proposed which allows each of recording apparatuses to hold identification (ID) information on a copied information signal and disables each recording apparatus from copying any information signal having the same ID information as the ID information already held therein. That is, the copy limiting system enables each recording apparatus to copy each information signal only once.

The copy limiting system disables the recording apparatus from further copying any information signal once copied. Therefore, since the above-mentioned high-speed copying technique cannot be used to make many copies of the same information signal when the copy limiting system is adopted, it is possible to positively prevent any fraudulent copying of an information signal and thus protect the copyrighter's due profits which would be lost or reduced due to such fraudulent copying of the information signal.

In this case, however, since the once-copied information signal cannot further be copied using the same recording apparatus by which the information signal has been copied once, copying of the information signal within a range of private use will be limited, which will cause the user not to conveniently use the information signal as the case may be.

Also, the copy limiting system enabling to copy the same information signal only once in each of recording apparatuses, makes it necessary to provide in each recording apparatus a memory capable of storing ID information on all copied information signals, and manage all the ID information stored in the memory. Thus, the load to the recording apparatus will be larger.

OBJECT AND SUMMARY OF THE INVENTION

It is therefore an object of the present invention to overcome the above-mentioned drawbacks of the prior art by providing a method for limited recording of an information signal, a system for controlled recording of an information signal, and an information signal recording apparatus, capable of effectively preventing an information signal from fraudulently being copied without impairing the user's convenience in using the information signal and with no increased load to the recording apparatus.

According to the present invention, there is provided a method for limited recording of an information signal, comprising the steps of:
  setting a time;
  recording a time-series signal;
  measuring an elapsed time from start of the recording step;
  comparing the measured elapsed time and the set time with each other; and
  limiting the recording step, after completion of the recording, if the comparison result shows that the present time is between the start of the recording step and the set time.

According to the present invention, there will also be provided a method for limited recording of an information signal, comprising the steps of:
  setting a time;
  reproducing a time-series signal for a standard playing time;
  recording the time-series signal;
  measuring an elapsed time from start of the recording step;
  comparing the measured time and the set time with each other; and
  limiting the recording step, after completion of the recording, if the comparison result shows that the present time is between the start of the recording step and the set time.

According to the present invention, there will also be provided a system for controlled recording of an information signal, composed of an information signal output device to provide as an information signal a time-series signal whose information content varies with time, for a time shorter than a standard playing time, and an information signal recording apparatus to record the information signal from the information signal output device, the information signal recording apparatus comprising:
  means for measuring an elapsed time from start of the recording; and
  a controlling means for comparing a preset time and the measured elapsed time with each other, and limiting the recording, after the information signal has been recorded, if the comparison result shows that the measured elapsed time is shorter than the preset time.

According to the present invention, there will also be provided a system for controlled recording of an information signal, composed of an information signal output device to provide as an information signal a time-series signal recorded in a recording medium, and an information signal recording apparatus to record the information signal from the information signal output device, for a standard playing time of the time-series signal,
  the information signal output device providing from the recording medium the information signal and identification information on the information signal; and
  the information signal recording apparatus including:
    means for receiving the information signal and identification information from the information signal output device;
    means for measuring a predetermined elapsed time from start of recording the information signal;
    a memory for storing the identification information from the receiving means; and
    a controlling means for disabling the information signal recording apparatus from recording the received information signal if the same identification information as already stored in the memory is received within the predetermined elapsed time measured by the time measuring means and after completion of the information signal recording.

According to the present invention, there will also be provided an information signal recording apparatus adapted to receive and record a time-series signal for a time shorter than a standard playing time of the time-series signal, the apparatus comprising:
  means for measuring an elapsed time from start of recording the time-series signal; and
  means for limiting re-recording of the time-series signal, after the time-series signal has been recorded and for the predetermined elapsed time measured by the time measuring means.

According to the present invention, there will also be provided an information signal recording apparatus adapted to receive an information signal as a time-series signal whose information content varies with time and an identification information on the information signal, and record the information signal for a time equal to a standard playing time of the information signal, the apparatus comprising:
  means for detecting the identification information on the information signal;
  a memory to hold therein, when recording the information signal, the identification information supplied from the identification information detecting means;
  means for measuring, from start of recording the information signal, a sum of a recording time and a predetermined period; and
  a recording function controlling means for controlling to disable the recording means from recording an information signal whose identification information is the same as already stored in the memory, after completion of the recording and for the sum of time measured by the time measuring means.

According to the present invention, there will also be provided a recording apparatus comprising:
  means for receiving an information signal and a time information on the information signal;
  means for recording the information signal;
  means for measuring an elapsed time from start of the recording by the recording means; and
  means for comparing an elapsed time from start of the recording, set based on the received time information, and the measured elapsed time with each other, and disabling the recording means from recording the same information signal if the measured elapsed time is shorter than the set elapsed time from start of the recording.

According to the present invention, there will also be provided a method for limited recording of an information signal, comprising the steps of:

receiving an information signal and a time information on the information signal;

recording the information signal into a recording medium;

measuring an elapsed time from start of the information signal recording; and comparing an elapsed time from start of the recording, set based on the time information, and the measured elapsed time with each other, and disabling re-recording of the same information signal into the recording medium if the measured elapsed time is shorter than the set elapsed time from start of the recording.

According to the present invention, there will also be provided a method for limited recording of an information signal, comprising the steps of:

reproducing an information signal from a first recording medium;

recording the reproduced information signal into a second recording medium;

setting time information based on the reproduced information signal;

measuring an elapsed time from start of the recording based on the recording step; and comparing the measured elapsed time and the set time information with each other, and disabling the recording, after the information signal has been recorded, if the measured elapsed time is shorter than the set time information.

In the present invention, after an information signal is copied by the high-speed copying technique (an information signal is copied for a time shorter than its standard reproduction or playing time for which it is normally reproduced), the recording function is limited for a predetermined period by disabling the high-speed copying, for example, to make it impossible to produce, for a short time, many recording media each having the same information signal copied therein.

Also, in the present invention, after the predetermined time passes, the recording function limitation is canceled and the same recording apparatus is disabled from copying the information signal once copied. Since the information signal can thus be copied for a private use, the user's convenience in using the information signal will not be impaired.

Also, in the present invention, since even after an information signal is copied by the high-speed copying technique, the limitation of the recording function will not be canceled so long as a time period longer than a time, which would be required to copy the information signal at the normal speed, has not passed, it is possible to positively prevent any fraudulent copying of the information signal, such as many copies of the same information signal made for a short time.

Also, in the present invention, it is disabled to make many copies of the same information signal for a short time. So, it is possible to prevent any fraudulent copying of the information signal, and thus the copyrighter's due profits from the information will not be caused to lessen by such fraudulent copying.

Also, in the present invention, identification information on an information signal should be held in the recording apparatus for a predetermined period after the information signal is copied. Thus, identification information on copied information signals will not be held limitlessly in the recording apparatus. Therefore, the memory for storage identification information may be a one of not so large a capacity and not so many identification information has to be managed, so that the recording apparatus to record information signals will not be applied with so large a load.

Also, in the present invention, since copying of an information signal is disabled for a predetermined period after the information signal has been copied once, it is possible to make many copies of the same information signal for a short time. Thus, it is possible to prevent the information signal from fraudulently being copied, and so the copyrighter's due profits from the information signal will not be reduced by such fraudulent copying.

Also, in the present invention, since the recording function limitation is canceled when a predetermined time passes after an information signal is copied and thus the information signal can be copied, it is enabled to copy the information signal for a private use. Therefore, it is possible to prevent any fraudulent copying of an information signal, and so the copyrighter's due profits from the information signal will not be caused to lessen by such fraudulent copying.

Also, in the present invention, production of many copies of a copy of the same information signal by the same recording apparatus needs a time longer than a time which would be for copying the information signal at the normal speed. So, fraudulent copying of an information signal can positively be prevented.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
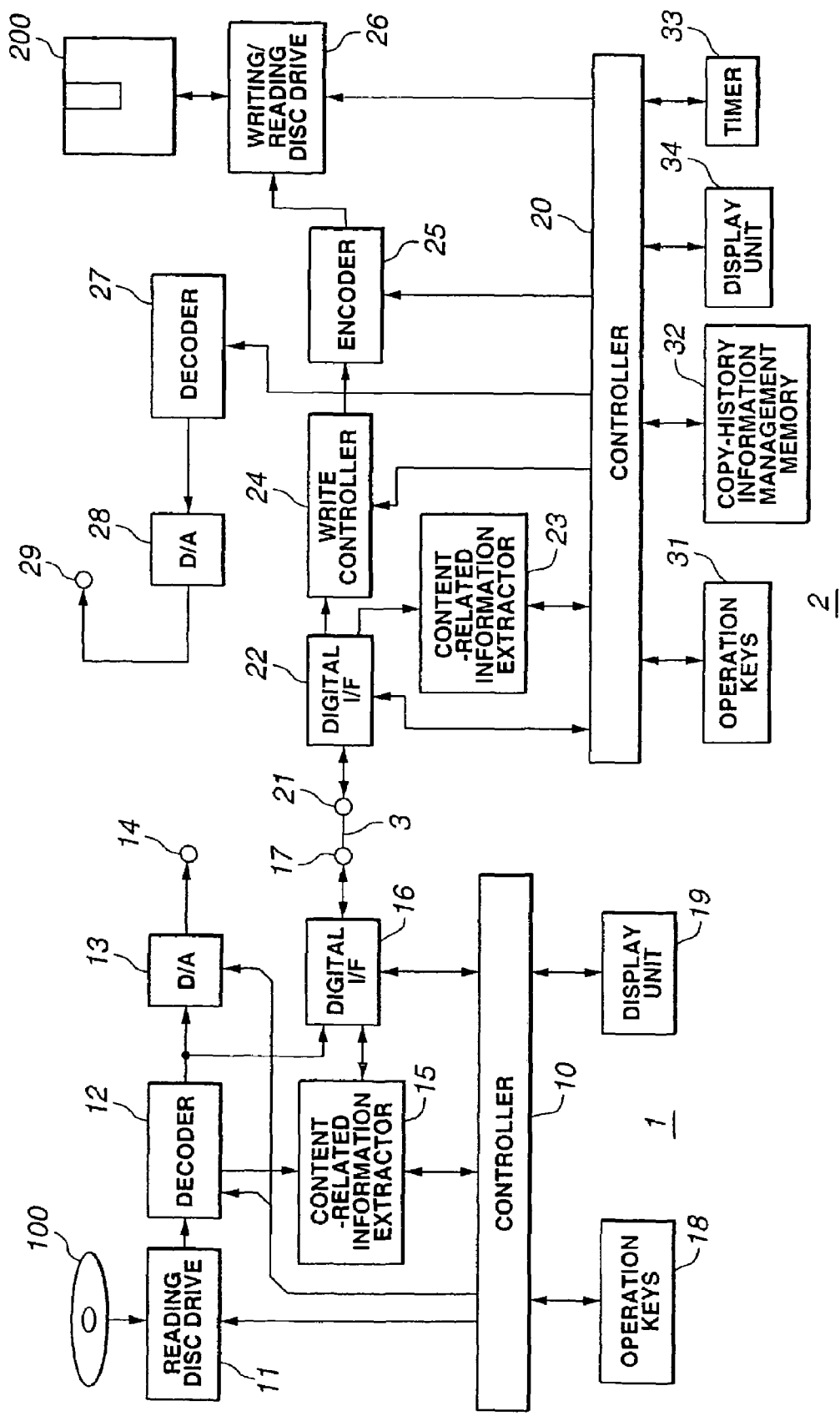
FIG. 1 is a schematic block diagram of an embodiment of the system for controlled recording of an information signal according to the present invention, in which the method for limited recording of an information according to the present invention is involved.

Referring now to FIG. 1, there is schematically illustrated in the form of a block diagram the embodiment of the system for controlled recording of an information signal according to the present invention, in which the method for limited recording of an information signal according to the present invention is applied.

As shown in FIG. 1, this embodiment includes a CD player generally indicated with a reference 1 and adapted to reproduce an audio signal recorded in a compact disc (will be referred to as "CD" hereinafter) and an MD recorder/player (will be referred to as "MD drive" hereinafter) generally indicated with a reference 2 and adapted to record an audio signal into a small magneto-optical disc called mini-disc (will be referred to as "MD" hereinafter) and reproduce an audio signal recorded in the MD, the CD player 1 and MD drive 2 being connected to each other via a high-speed bus 3.

As will be seen from FIG. 1, the CD player 1 includes a controller 10, a reading disc drive 11, a data decoder 12, a D/A converter 13, an analog audio signal output terminal 14, a content-related information extractor 15, a digital interface 16 (presented as "digital I/F" in FIG. 1), a digital data input/output terminal 17, operation keys 18, and a display unit 19. The controller 10 is a micro computer incorporating a CPU, ROM, RAM, etc. to control each block of the CD player 1.

The MD drive 2 is an application of the information signal recorder according to the present invention. As shown in FIG. 1, the MD drive 2 includes a controller 20, a digital data input/output terminal 21, a digital interface 22 (presented as "digital I/F" in FIG. 1), a content-related information extractor 23, a write controller 24, a data encoder 25, a writing/reading disc drive 26, a data decoder 27, a D/A converter 28, an analog audio signal output terminal 29, operation keys 31, a copy-history information management memory 32, a timer (clock circuit) 33 and a display unit 34. Similarly to the controller 10 in the CD player 1, the controller 20 is a micro computer incorporating a CPU, ROM, RAM, etc. to control each block of the MD drive 2. It should be noted that the timer 33 and controller 20 are energized by a rechargeable battery to continuously work for time keeping even when the power supply to the system is turned off. Also note that the memory 32 is a non-volatile memory to hold data stored therein.

When the CD player 1 and MD drive 2 are connected to each other via the digital interfaces 21 and 22, the controllers 10 and 20 provided in the CD player 1 and MD drive 2, respectively, will recognize each other and it is displayed on the display units 19 and 34 whether they are connected to each other or not.

This embodiment including the CD player 1 and MD drive 2 has a so-called dubbing function to copy an audio signal recorded in a CD in the CD player 1 into an MD in the MD drive 2. The dubbing function can be performed according to a user's instruction supplied from the operation keys 18 of the CD player 1, operated by the user.

The dubbing function of this embodiment provides a so-called high-speed copying mode to copy an audio signal for a time shorter than a standard playing time for which the audio signal is normally reproduced. In this embodiment, the high-speed copying is done at a high speed derived from synchronization with a reading drive speed of the reading disc drive 11 in the CD player 1 and the writing drive speed of the writing/reading disc drive 26 in the MD drive 2. This will further be described later.

As aforementioned, use of the high-speed copying function permits to make many recording medium each having the same audio signal recorded therein for a relatively short time. Thus, fraudulent use of the high-speed copying function will possibly cause the copyrighter of the audio signal to lose his due profits from the audio signal.

To protect the copyrighter's due profits from the audio signal, this embodiment of the information signal copy control system is adapted such that the recording function of the MD drive 2 is disabled for a predetermined period after the audio signal is dubbed into an MD, namely, after completion of the high-speed copying, to prevent the dubbing function for the high-speed copying from fraudulently being used. The information signal copy control system will be described herebelow concerning primarily the dubbing function for the high-speed copying.

When an instruction for dubbing is supplied to the system by the user operating the operation keys 18 of the CD player 1, the controller 10 of the CD player 1 will synchronize the CD player 1 and MD drive 2 with each other and put them into a reading mode and a writing mode, respectively, to enable dubbing from the CD player 1 to the MD drive 2. In this case, since the dubbing of an audio signal from the CD and MD is effected by the high-speed copying, the controller 10 of the CD player 1 will provide a high-speed read command to the reading disc drive 11 of the CD player 1, and a high-speed write command to the controller 20 of the MD drive 2.

In this case, the high-speed write command will be supplied from the controller 10 of the CD player 1 to the controller 20 of the MD drive 2 over the high-speed bus 3 or any other control line.

In this embodiment, the reading disc drive 11 of the CD player 1 drives to spin a CD 100, a recording medium, set in the CD player 1 and reads a digital signal recorded in the CD 100.

The CD 100 has recorded therein a content ID peculiar to a digital audio signal as a content information recorded in a CD such as ISRC (International Standard Recording Code) and content-related information such as standard playing time for which the digital audio signal is reproduced, and the reading disc drive 11 can read the content-related information as well from the CD 100 and provide it as an output.

When the high-speed read command is supplied to the reading disc drive 11 of the CD player 1, the writing drive speed at the reading disc drive 11 will be set more than two times, for example, higher than the normal speed at which the audio signal is reproduced for the standard playing time of the signal.

The high-speed read command contains a signal indicative of a reading sped at the reading disc drive 11. The signal indicates a two-time higher speed or a four-time higher speed, for example, in accordance with which a writing speed at the writing disc drive is set.

When dubbing an audio signal into an MD set in the MD drive 2, namely, when the high-speed write command is supplied from the CD player 1 to the controller 20 of the MD drive 2, the controller 20 will set the writing/reading disc drive 26 of the MD drive 2 to a digital signal writing mode, and control, with a signal indicating of a reading speed, the writing drive speed to a high speed synchronously with the reading drive speed. Thus, the audio signal can be copied at the high speed. Namely, a digital audio signal recorded in a CD can be copied at a speed at least two times higher than the speed in a normal-speed copying which is done for a time equal to the standard playing time of the audio signal.

When the dubbing function of this embodiment is performed, the controller 10 of the CD player 1 will stop the D/A converter 13, for example, from operating in order not to reproduce any analog audio signal while putting into operation the content-related information extractor 15 which will further be described and the digital interface 16 in order to effect only the high-speed copying.

When the dubbing function is started as in the above, a digital data read by the reading disc drive 11 from the CD 100 will be supplied to the decoder 12 which will decode the supplied digital data by EFM modulation or the like to reproduce a digital audio data.

The digital audio signal reproduced by the decoder 12 will be supplied to the digital interface 16. Also a content-related information such as a content ID and playing time, read from the CD 100, will be supplied to the content-related information extractor 15 through the decoder 12.

The content-related information extractor 15 will extract from the digital data supplied from the decoder 12 a content ID corresponding to the digital audio signal provided through the digital interface 16, and necessary content-related information such as a standard playing time of the digital audio signal, and supply them to the digital interface 16.

The digital interface 16 will convert the supplied digital audio signal and content-related information to a transmission data conforming to a transmission protocol of the high-speed bus, and deliver the transmission data at the input/output terminal 17 to the MD drive 2 over the high-speed bus 3.

The transmission data transmitted over the high-speed bus 3 will be supplied to the digital interface 21 via the digital data input/output terminal 21 of the MD drive 2. The digital interface 22 of the MD drive 2 will convert the transmission data supplied from the CD player 1 to a digital data in a format in which it can be dealt with in the MD drive 2. The digital interface 21 will supply the digital audio signal to the write controller 24 while supplying digital data such as content-related information to the content-related information extractor 23.

The content-related information extractor 23 will extract from the digital data supplied from the CD player 1 a content ID and content-related information such as a standard playing time of a digital audio signal which is to be copied at the high speed, and supply them to the controller 20.

In this embodiment, the controller 20 in the MD drive 2 has connected thereto the copy-history information management memory 32 and timer (clock circuit) 33 as shown in FIG. 1. The copy-history information management memory 32 will hold a content ID of the digital audio signal transmitted from the CD player 1 to the MD drive 2 for a sum of a high-speed copying time and a preset time period for which the recording function is disabled, from start of the high-speed copying.

Upon start of the high-speed copying, the timer 33 will start a measurement of the sum of the high-speed copying time and preset time period for which the recording function is disabled. In this embodiment, a time required for a normal-speed copying of a digital audio signal in consideration under the assumption that the digital audio signal is copied in the normal-speed copying mode, after start of the high-speed copying of the digital audio signal, is measured as a sum of the high-speed copying time and preset time period of recording function disabling.

For this time period measured by the timer 33, the content ID of the digital audio signal to be copied at the high speed will be held in the copy-history information management memory 32.

When supplied with a high-speed write command from the CD player 1, the controller 20 of the MD drive 2 will judge, based on the content ID extracted by the content-related information extractor 23, whether the same content ID as the extracted content ID is already stored in the copy-history information management memory 32.

In this embodiment, if the same content ID as that from the content-related information extractor 23 is already stored in the copy-history information management memory 32, since a time period which would be required for the digital audio signal of the content ID to be copied at the normal speed has not yet passed from start of the precedent high-speed copying, a control signal to disable the high-speed copying is generated and supplied to the write controller 24.

Supplied with the high-speed copy-disabling control signal from the controller 20, the write controller 24 will not supply the encoder 25 with any digital audio signal from the digital interface 22 to disable any high-speed copying of the digital audio signal. Thus, the high-speed copying is disabled.

If the same content ID as that from the content-related information extractor 23 is not stored in the copy-history information management memory 32, the digital audio signal should not have been copied at the high speed by the MD drive 2 or a time period which would be required for the digital audio signal to be copied at the normal speed should not yet have passed from start of the precedent high-speed copying.

The controller 20 will manage the predetermined time period for which the recording function of the MD drive 2 is disabled (recording-limiting period) as having previously been described by storing into the copy-history information management memory 32 the content ID of a digital audio signal to be copied at the high speed, setting in the timer 33 the standard playing time of the digital audio signal in consideration, provided through the content-related information extractor 23, and counting down a set standard playing time from a start time of the high-speed copying on the real-time basis. It should be noted that a relation between the content ID and start time may be stored as a management table data in the copy-history information memory 32 and a time counted by the timer 33 be compared with the management table data, thereby disabling the recording function based on the comparison result.

If the same content ID as that from the content-related information extractor 23 is not stored in the copy-history information management memory 32, the write controller 24 will be supplied from the controller 20 with a control signal which enables the high-speed copying, and supply the encoder 25 with the digital audio signal from the digital interface 22.

The encoder 25 will encode the supplied digital audio signal by data compression using ATRAC (Adaptive Transform Acoustic Coding), for example, and supply the coded digital audio signal to the writing/reading disc drive 26.

In this embodiment, the writing/reading disc drive 26 will drive the MD 200 to write a digital signal to the MD 200 or read a digital signal from the MD 200. As mentioned above, for dubbing a digital audio signal from CD to MD, the writing/reading disc drive 26 will be controlled by the controller 20 to be in a digital signal recording mode and for the writing disc drive speed to be high synchronously with the reading disc drive speed.

Thus, the writing/reading disc drive 26 will write the digital audio signal from the encoder 25 to the MD 200 at the high speed. In this way, a digital audio signal recorded in the CD 100 will be copied to the MD 200 at a high speed which is at least two times higher than the normal speed at which the digital audio signal is reproduced for the standard playing time.

The content ID of the digital audio signal copied to the MD 200 at the high speed will be held in the copy-history information management memory 32 for a time period which would be required for the digital audio signal to be copied at the normal speed, from start of the high-speed copying of the digital audio signal.

Thus, even when it is tried to copy again the digital audio signal copied at the high speed to the MD 200 before elapse, from start of the high-speed copying of the digital audio signal, of the time period which would be required for the digital audio signal to be copied at the normal speed, since the content ID of the digital audio signal is held in the copy-history information management memory 32, copying the digital audio signal is disabled.

However, when the content ID of the digital audio signal copied to the MD 200 at the high speed is deleted from the copy-history information management memory 32 after elapse, from start of the high-speed copying of the digital audio signal, of the time period which would be required for the digital audio signal to be copied at the normal speed, it is enabled to copy the digital audio signal repeatedly.

Thus the high-speed copying of the same digital audio signal is disabled for a predetermined period after completion of the high-speed copying, to prevent any fraudulent use of the high-speed copying function from fraudulently to produce many pieces of MD each having the same digital audio signal copied therein for a short time. Therefore, it is possible to effectively prevent an fraudulent copying of an information signal, and so the copyrighter's due profits from the information signal will not be caused to lessen by such fraudulent copying.

After elapse, from start of the high-speed copying of the digital audio signal, of the time period which would be required for the digital audio signal to be copied at the normal speed, namely, after the high-speed copying is over and the predetermined period following the high-speed copying of the digital audio signal passes, the content ID of the digital audio signal copied at the high speed, held in the copy-history information management memory 32 is deleted so that the digital audio signal copied at the high speed can be copied again.

Thus, since it is made possible to repeatedly copy the digital audio signal as usual after elapse of the time period which would be required for the digital audio signal to be copied at the normal speed, the copying of the digital audio signal for a private use will not be disabled and so the user's convenience in using the digital audio signal will not be impaired.

Repeated copying of the same digital audio signal is disabled for the predetermined period following the completion of the high-speed copying of the digital audio signal while the digital audio signal can be copied into the MD rapidly by the high-speed copying. Thus, the digital audio signal can be copied for a short time by the high-speed copying technique for the private use, which will enhance the user's convenience in use of the digital audio signal.

The MD drive 2 in this embodiment is also adapted to reproduce a digital signal recorded in the MD 200. That is, when a read instruction is supplied to the MD drive 2 by the user operating the operation keys 31 of the MD drive 2, the controller 20 will supply a read command to the writing/reading disc drive 26. Thus the writing/reading disc drive 26 will be set to read a digital audio signal recorded in the MD 200 for the standard playing time.

The writing/reading disc drive 26 will read the digital audio signal recorded in the MD 200 and supply it to the decoder 27. The decoder 27 will decode the compressed digital audio signal by decompression or the like, and supply the decoded digital audio signal to the D/A converter 28.

The D/A converter 28 will convert the digital audio signal to an analog audio signal and deliver it at the analog audio output terminal 29. The output analog audio signal is supplied to a speaker, headphone or earphone through which a sound corresponding to the analog audio signal is released.

In the MD drive 2 in this embodiment, the recording function is disabled as in the above but the reproducing function will not be disabled, so that the user's convenience in using an information signal will not be impaired.

Also, the CD player 1 in this embodiment is adapted to reproduce a digital audio signal recorded in the CD 100. Namely, when a read instruction is supplied to the CD player 1 by the user operating the operation keys 18 of the CD player 1, the controller 10 will supply a read command to the reading disc drive 11. Thus the reading disc drive 11 will be set to read a digital audio signal recorded in the CD 100 for the standard playing time.

In this embodiment, the content-related information extractor 15 and digital interface 16 are controlled not to operate for example at this time but only to read a digital audio signal recorded in the CD 100.

The digital audio signal read from the CD 100 by the reading disc drive 11 will be supplied to the decoder 12. The decoded digital audio signal from the decoder 12 will be supplied to the D/A converter 13 which will convert the digital audio signal to an analog audio signal and deliver it at the analog audio signal output terminal 14. The output analog audio signal is supplied to a speaker, headphone or earphone through a sound corresponding to the analog audio signal will be released.

Figure 2:
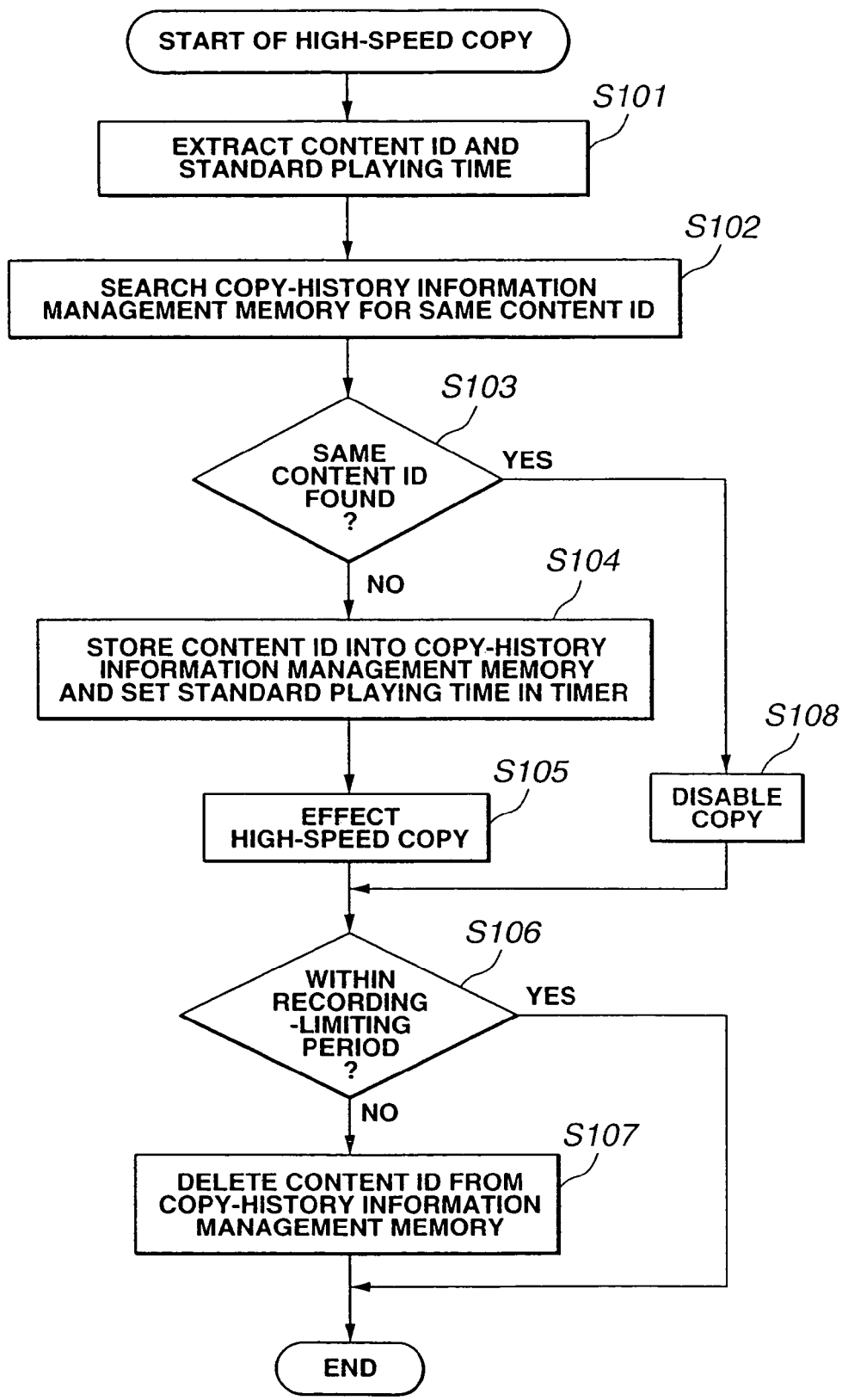
FIG. 2 is a flow chart of operations effected at the time of a high-speed copying to a recording/reproducing apparatus in the system for controlled recording of an information signal in FIG. 1.

Referring now to FIG. 2, there is shown a flow chart of the operations effected in this embodiment for the high-speed copying of a digital audio signal recorded in the CD 100 set in the CD player 1 to the MD 200 set in the MD drive 2. As seen from the flow chart in FIG. 2, the high-speed copying of a digital audio signal is done at the MD drive 2 in such a manner that the same digital audio signal is prevented from fraudulently being copied by disabling copying of the digital audio signal for a predetermined period following the completion of the high-speed copying of the digital audio signal as previously been described.

As having been described in the foregoing, when an instruction for the dubbing function is given by operating the operation keys 18 of the CD player 1, the reading disc drive 11 of the CD player 1 is supplied with a high-speed read command while the controller 20 of the MD drive 2 is supplied with a high-speed write command, and the high-speed copying is started.

Then at step S101, the MD drive 2 will be supplied from the CD player 1 with a transmission data including a digital audio signal and content-related information of the digital audio signal. The controller 20 will extract, by means of the content-related information extractor 23, necessary information such as a content ID of the digital audio signal to be copied at the high speed, standard playing time of the digital audio signal, etc.

Note that based on the extracted information as well as on the synchronized status of the servo circuit in the digital interface, it is determined at which playing speed the digital audio signal is to be reproduced. When the playing speed is a two-time higher speed, for example, a time double the time from start until completion of the reproduction may be taken as the standard playing time.

Next at step S102, the controller 20 will judge whether the same content ID as the extracted one is already stored in the copy-history information management memory 32. Then at step S103, the controller 20 will judge whether the same content ID is stored in the copy-history information management memory 32.

If the controller 20 decides at step S103 that the same content ID is not stored in the copy-history information management memory 32, then at next step S104, it will control the copy-history information management memory 32 to store therein the extracted content ID as copy-history information, set in the timer 33 a standard playing time of the digital audio signal to be copied at the high speed, having been extracted by the content-related information extractor 23, and count down the set value in the timer 33 on the real-time basis, to thereby manage the recording-limiting period for which the recording function is to be disabled.

At step S105, the controller 20 will control the write controller 24 to supply the digital audio signal from the digital interface 22 to the encoder 25, thereby copying the digital audio signal to the MD 200.

Upon completion of the high-speed copying of the digital audio signal at step S105, the controller 20 will judge at step S106 whether the high-speed copying has been completed within the recording-limiting period for the digital audio signal, managed by the timer 33. This judgment at step S106 will be effected also after it has been decided at step S103 that the content ID of the digital audio signal to be copied at the high speed is already stored in the copy-history information management memory 32 as well as after the write controller 24 has been controlled at step S108 to disable the copying.

More particularly, at step S106, it is judged whether the recording-limiting period for the digital audio signal copied at the high speed has passed or the recording-limiting period for the digital audio signal of which high-speed copying has been tried but disabled has passed. If it is decided at step S106 that the recording-limiting period has not yet passed, the process shown in FIG. 2 will be aborted.

If it is decided at step S106 that the high-sped copying has not been completed within the recording-limiting period, that is, within the recording-limiting period for the digital audio signal having been copied at the high speed or whose high-speed copying has been tried, the controller 20 will delete, at step S107, from the copy-history information management memory 32 the content ID of the digital audio signal having been copied at the high speed or whose high-speed copying has been tried, and abort this process in FIG. 2.

After the content ID of the digital audio signal having been copied at the high speed or whose high-speed copying has been tried is deleted, at step S107, from the copy-history information management memory 32, it is made possible to copy at the high speed again a digital audio signal having the content ID having been deleted from the copy-history information management memory 32.

In this embodiment, the operations for the high-speed copying shown in the flow chart in FIG. 2 will be repeated under the control of the controller 20 of the MD drive 2 each time the dubbing function is performed. Thus, the same digital audio signal will not be copied within the recording-limiting period but it is enabled after the recording-limiting period passes to copy a digital audio signal copied once at the high speed again at the high speed.

In this embodiment, the requirements for the user's convenience of the high-speed copying and copyright protection of the copyrighter can be met at the same time. Namely, the high-speed copying can be made while serial mass copying of the same digital audio signal can be prevented.

Also since different digital audio signals can be copied successively at the high speed, the user's convenience in use of the digital audio signals will not be impaired but will be rather improved by the high-speed copying.

This embodiment may be adapted such that if the content ID of the digital audio signal whose high-speed copying has been tried is stored in the copy-history information management memory 32 and the recording-limiting period for the digital audio signal in consideration has not yet passed, a message like "Recording being disabled" for example is displayed on the display unit 19 or 34 (for example, LCD) of the CD player 1 or MD drive 2, respectively, to alarm the user that his or her desired digital audio signal cannot be dubbed from the CD to MD.

Similarly, the embodiment may be adapted such that if the content ID of the digital audio signal whose high-speed copying has been tried is stored in the copy-history information management memory 32, and the recording-limiting period for the digital audio signal in consideration has passed and thus the content ID has been deleted from the copy-history information management memory 32, a message like "Recording disabling canceled. Dubbing enabled by retrying it" is displayed on the display unit 19 or 34 (for example, LCD) of the CD player 1 or MD drive 2, respectively, to alarm the user that the disabling of recording his desired digital audio signal has been canceled and the digital audio signal can be dubbed from the CD to MD.

As in the above, the content ID stored in the copy-history information management memory 32 is deleted only when the dubbing function is performed and high-speed copying is done. However, the MD drive 2 may be adapted to delete a one of content IDs stored in the copy-history information management memory 32 and whose recording-limiting period has passed at a predetermined time such as immediately after the power is supplied to the system or at each predetermined time interval, for example.

Thus, the number of content IDs stored in the copy-history information management memory 32 will not limitlessly be large but will be disabled to some extent, so that the copy-history information management memory 32 may be a one whose storage capacity is small and many content IDs have not to be managed. So the load to the MD drive 2 will be smaller than that when such a control is made to disable re-copying of all digital audio signals once.

In the aforementioned embodiment, the dubbing of a digital audio signal from the CD 100 to MD 200 is effected by the high-speed copying, and also after completion of the high-speed copying, the same digital audio signal cannot be copied repeatedly until elapse of a period from start of the high-speed copying of the digital audio signal until completion of the normal-speed copying of the digital audio signal which would have been copied at the normal speed.

Namely, the sum of the high-speed copying time period and the predetermined time period following the high-speed copying time period is set as the time period required for copying a desired digital audio signal which would have been copied at the normal speed. According to the present invention, however, the recording-limiting period is not limited to such a length of time.

Some of the copyrighters of digital audio signals will wish to positively protect their profits from their digital audio signal by disabling, when their digital audio signal is copied by the user, the recording function of the MD drive 2 for a longer period.

Taking in account the above case, the sum of the high-speed copying time period and a predetermined time following the high-speed copying time period may be set relatively long such as 1 hour, 2 hours, . . . , one day, two days, one week, two weeks, . . . , one month, two months, . . . . For this purpose, information on a period for which recording function is disabled, namely, recording-limiting period information, for example, may be recorded in all CDs each having a digital audio signal recorded therein for service to end users.

When dubbing a digital audio signal, the recording-limiting period information is supplied as content-related information along with the digital audio signal to the MD drive 2 to effect the high-speed copying of the digital audio signal and disable the recording function of the MD drive 2 until the period indicated by the recording-limiting period information passes after start of the high-speed copying even after the high-speed copying is complete.

Thus, the digital audio signal can be copied for a private use but the digital audio signal copied once cannot be copied before for example a few hours or a few days have passed after start of the high-speed copying. Since the recording function can thus be disabled for a relatively long period, it is possible to more positively prevent the digital audio signal from fraudulently being copied. For example, based on recording-limiting information recorded in the CD 100, the recording function of the MD drive 2 is disabled after all digital audio signals in the CD 100 are copied at the high speed. Note that the recording may be disabled based on not such recording-limiting information but on a recording time calculated from the specific storage capacity of a recording medium.

The recording disabling period information may not be recorded only in the recording medium of a digital audio signal, namely, a CD in this embodiment. A predetermined recording disabling period information may be held in the memory, for example, of the MD drive 2 to which the digital audio signal is to be copied, and a period for which the recording function is to be disabled may be set based on the recording disabling period information held in the memory of the MD drive 2.

The aforementioned embodiment is adapted such that when it is tried to copy the same digital audio signal at the high speed, the recording function of the MD drive 2 is disabled to prevent many copies of the same digital audio signal from being made for a relatively short time.

Also, in addition to the aforementioned arrangement that only the high-speed copying of the same digital audio signal is disabled, another arrangement may be made that when a digital audio signal has been copied at the high speed, it is made impossible to copy all the digital audio signals at the high speed for a predetermined time period. In this case, the content data of the digital audio signals may not be stored and managed in the MD drive 2 but the recording function disabling period may be managed, so that the load to the MD drive 2 can be lessened.

In the aforementioned embodiment, the sum of the high-speed copying period and the predetermined period following the high-speed copying period, from a time at which a desired digital audio signal has been copied at the high speed is set to be a time which would be required for the digital audio signal in consideration to be copied at the normal speed. However, the present invention is not limited to such a time setting.

For example, the recording disabling period may be a time measured from completion of the copying. Therefore, the predetermined period after completion of the high-speed copying may be a time which would be required for the digital audio signal to be copied at the normal speed. The recording function may be disabled for this period.

Also the aforementioned embodiment has been described concerning the dubbing function which is to be performed for the high-speed copying. However, the present invention is not limited to this dubbing function but the embodiment may be adapted such that the user of a digital audio signal can select either the normal-speed copying or high-speed copying as necessary.

In case either the normal-speed or high-speed copying can thus be selected, any fraudulent copying of a digital audio signal, which will lessen the copyrighter's due profits from the digital audio signal, can be prevented by disabling at least the high-speed copying of the same digital audio signal for a predetermined period after completion of the high-speed copying as having previously been described, only when the high-speed copying is selected.

Of course, the embodiment may be adapted such that both the high-speed copying and normal-speed copying of the same digital audio signal, that is, the recording function itself, are disabled for the predetermined period after completion of the high-speed copying.

Further, the embodiment may be adapted such that also when the normal-speed copying is selected, either the normal-speed or high-speed copying, or both the normal-speed and high-speed copying, is disabled for the predetermined period after completion of the normal-speed copying. If the copying of any other digital audio signal than a digital audio signal copied at the normal speed is disabled, however, the copying of the digital audio signal for a private use will also be limited.

In this situation, similar to the concept of the high-speed copying in the aforementioned embodiment, an arrangement may be made that when a digital audio signal has been copied at the normal speed, the recording function is limited so that neither the normal-speed copying nor high-speed copying of the same digital audio signal is disabled for a predetermined period after completion of the normal-speed copying.

Since it is thus made possible to copy a digital audio signal having not yet been copied or a digital information signal having been copied at the normal speed a predetermined time before, the convenience of the user of the digital signal cannot be impaired.

For copying at the normal speed, a sum of the normal-speed copying period and a predetermined time following the normal-speed copying is set longer than the standard playing time of a desired digital audio signal. Since for copying a digital audio signal at the normal speed and copying the same digital audio signal serially, a longer time than that for the normal-speed copying is required, it is possible to prevent any fraudulent copying of a digital audio signal such as production of many pieces of MD each having the same digital audio signal copied therein.

Further, by setting the predetermined time after completion of whichever the copying is the high-speed or normal-speed one to be longer than the standard playing time of a desired digital audio signal, it is made possible to disable the high-speed copying of the same digital audio signal immediately after it is copied at the normal speed or the normal-speed copying of the same digital audio signal immediately after it is copied at the high speed.

Thus, even if the normal-speed copying or high-speed copying can be selected, it is made possible by alternately using the normal-speed copying and high-speed copying to prevent a fraudulent copying of a digital audio data such as generation of many copies of the same digital audio signal for a shorter time than required when an MD having the same digital audio signal copied therein is used only at the normal speed or at the high speed.

Also, by using, as a content ID, specific identification information on each of CDs each having the same digital audio signal recorded therein, it is made possible to disable the recording function after completion of the copying described in the above for each of the CDs. In addition, by using specific identification information on each group of digital audio signals such as music pieces recorded in a CD, it is made possible to disable the recording function after completion of the copying of the digital audio signals.

Further, as having been described in the foregoing, the content ID of a digital audio signal coped from the CD to MD in the aforementioned embodiment is identification information recorded in a CD such as ISRC. According to the present invention, however, the content ID is not limited to such identification information.

For example, a CD has added to any other region thereof than an area where a digital data is recorded information taking the form of a bar code and based on which it can be discriminated whether the CD is a one having the same digital audio signal is recorded. Information can be read from the bar code and used as a content ID. That is, a variety of information by which an information signal going to be copied such as a digital audio signal can be discriminated, may be used as a content ID.

Also as having been described in the foregoing, the embodiment of the present invention is an information signal copy control system including the CD player and MD drive. However, the present invention is not limited to this construction but can provide an information signal copy control system include an MD player or MD recorder/player and an MD recorder or MD recorder/player, a one including a DVD player and an MD recorder or MD recorder/player, a one including a plurality of computers each of which transmits and receives a digital data, etc.

Namely, the present invention can provide a variety of information signal copy control systems each including one of a variety of information output devices to output an information signal and a recorder which receives the information signal supplied from the information signal output device and records into a recording medium.

For example, in an information signal copy control system including an MD player and MD recorder, a digital audio signal recorded in an MD has been subjected to data compression. By supplying such a compressed digital audio signal to the MD recorder and copying it as compressed to the MD, the copying can be done at a higher speed than the copying of a digital audio signal not compressed. The higher the data compression ratio, at the higher speed the digital data can be copied.

Therefore, the high-speed copying technique by which an information signal such as a digital audio signal is copied for a shorter time than the standard playing time of the information signal, includes not only a high-speed copying effected at an increased reading drive speed and writing drive speed but a recording into a recording medium of a compressed information signal supplied to the recorder and kept compressed. Copying of an information signal can be controlled using a standard playing time derived from content-related information, and also using a standard playing time of a compressed information signal calculated based on the storage capacity of a recording medium to be read.

Also in the aforementioned embodiment, a content ID and content-related information such as a standard playing time are transmitted as digital data to a digital audio signal recorder/player according to the protocol of the high-speed bus. However, the present invention is not limited to this arrangement. For example, an electronic watermark technique may be used to convert content-related information to an electronic watermark, the content-related information converted to the electronic watermark be superposed on an information signal such as a digital audio signal, and the information be supplied to a recorder in which it will be recorded into a recording medium.

The electronic watermark technique is to bury information as a noise in a part of a video data and music data that is not important for the human sensation, namely, in a part not redundant for a music and image. Additional information such as content-related information buried in a video signal and audio signal by the electronic watermark technique can hardly be removed from the video and audio signals. On the other hand, even after a video signal and audio signal are filtered and compressed, additional information buried in the signals by the electronic watermark technique can be detected in the signals.

Thus, by providing a content-related information extractor in a recorder and recorder/player in which an information signal such as a digital audio signal is recorded into a recording medium, it is made possible to extract a content ID and standard playing time from the content-related information as an electronic watermark, and limit, using the extracted information, the recording function of the recorder and recorder/player for a predetermine period after completion of copying the information signal such as digital audio signal, as having previously been described.

Also, since the electronic watermark can hardly be removed or altered, it is made possible to limit the recording function of the recorder and recorder/player for a predetermined period also after completion of copying an analog audio signal as an information signal at the high speed by superposing content-related information as an electronic watermark on the analog audio signal.

Of course, a digital information signal as a digital audio signal may be outputted with a content-related information as an electronic watermark superposed thereon. Also in this case, by providing in the recorder and recorder/player an extractor to extract content-related information superposed as an electronic watermark on the digital information signal, it is made possible to extract a content ID and standard playing time from the content-related information as an electronic watermark and limit, using the extracted information, the recording function of the recorder and recorder/player for a predetermined period after completion of copying the information signal such as digital audio signal, as having previously been described.

Also, content-related information as an electronic watermark may be superposed on an information signal by the content provider at the time of authoring for recording the information signal in a recording medium such as a CD. Further at the player, extracted content-related information may be used as an electronic watermark and the content-related information as the electronic watermark be superposed on the information signal to be provided to the recorder.

As in the aforementioned embodiment, by providing a dubbing function, it is made possible, when it can definitely be known that an information signal output is to be dubbed from the player, to limit the playing function of the player instead of liming the recording function of the recorder/player as in the above.

That is, any fraudulent copying of an information signal such as a digital audio signal may be prevented by providing the same information signal for copying for a predetermined period when the information signal is provided for high-speed copying. In this case, a copy-history information management memory and timer are provided in the player to limit the playing function for a predetermined period as in the MD drive 2. For example, the timer is used to disable retransmission to the high-speed bus for a standard playing time or disable copying of data to be re-transmitted.

In the foregoing, the present invention has been described concerning the embodiment in which a digital audio signal is copied. According to the present invention, however, the information signal is not limited to any digital audio signal but it may include a variety of time-series signals whose content varies or a variety of information signals such as computer data.

Also, the copy generation management systems such as SCMS and CGMS may be used in combination. Thus, it is possible to prevent an information signal once copied from further being copied, so it is possible to more positively prevent any fraudulent copying of an information signal, and thus the copyrighter's due profits from the information signal will not be caused to lessen by such fraudulent copying.

What is claimed is:

1. A system for controlled recording of an information signal, composed of an information signal output device to provide as an information signal a time-series signal recorded in a recording medium, and an information signal recording apparatus to record the information signal from the information signal output device, for a standard playing time of the time-series signal, the information signal output device providing from the recording medium the information signal and identification information on the information signal; and the information signal recording apparatus comprising:
- means for receiving the information signal and identification information from the information signal output device;
- means for measuring a predetermined elapsed time from start of recording the information signal;
- a memory for storing the identification information from the receiving means; and
- a controlling means for disabling the information signal recording apparatus from recording the received information signal, after the information signal has been recorded and for the predetermined elapsed time measured by the time measuring means, if the same identification information as already stored in the memory is received.

2. An information signal recording apparatus adapted to receive an information signal as a time-series signal whose information content varies with time and an identification information on the information signal, and record the information signal for a time equal to a standard playing time of the information signal, the apparatus comprising:
- means for detecting the identification information on the information signal;
- a memory to hold therein, when recording the information signal, the identification information supplied from the identification information detecting means;
- means for measuring, from start of recording the information signal, a sum of a recording time and a predetermined period; and
- a recording function controlling means for controlling to disable the recording means from recording an information signal whose identification information is the same as already stored in the memory, after completion of the recording and for the sum of time measured by the time measuring means.

* * * * *